Feb. 13, 1968  R. H. MERRICK  3,368,367
SOLUTION STORAGE ARRANGEMENT FOR ABSORPTION
REFRIGERATION SYSTEMS
Filed Sept. 16, 1966
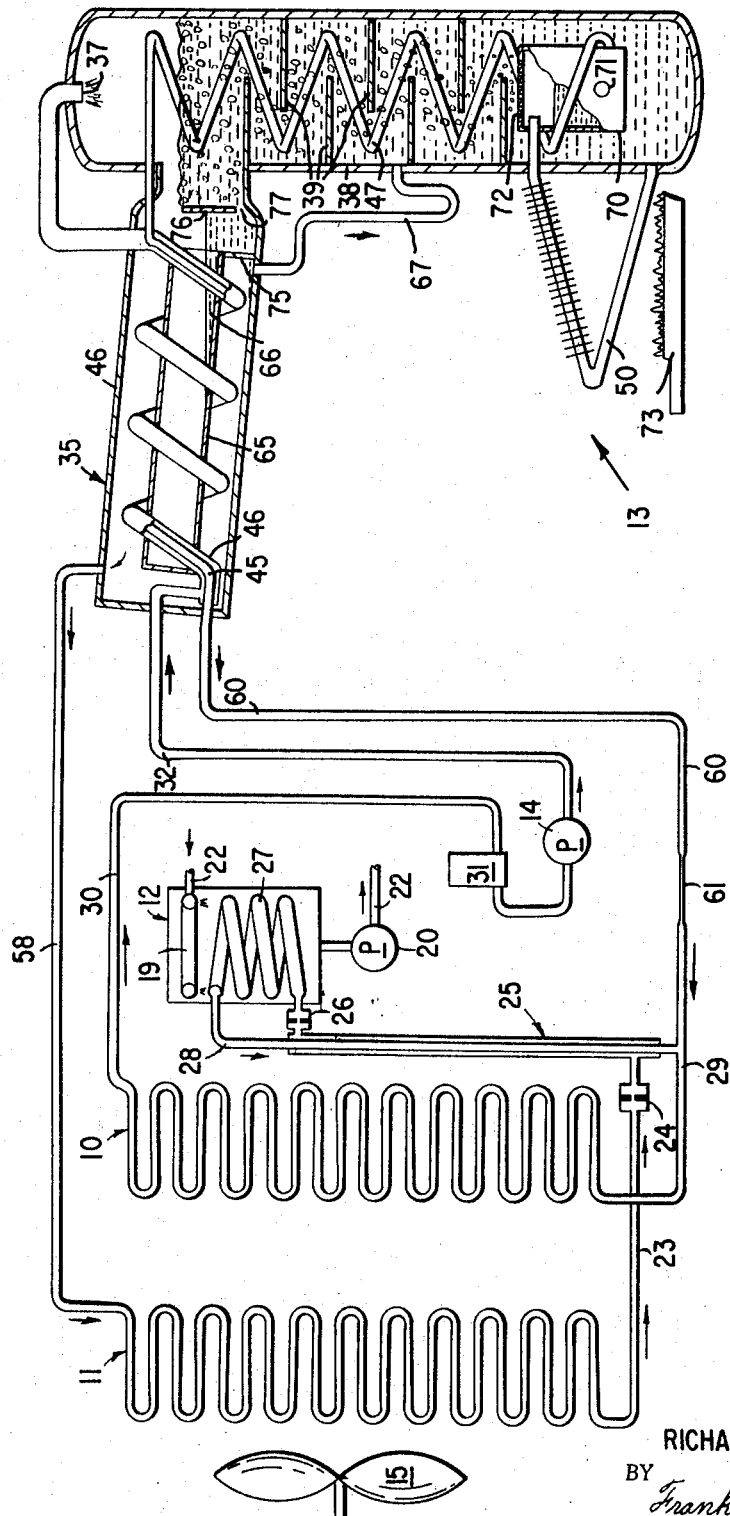
INVENTOR.
RICHARD H. MERRICK.
BY Frank N. Decker Jr.
ATTORNEY.

United States Patent Office 3,368,367
Patented Feb. 13, 1968

3,368,367
SOLUTION STORAGE ARRANGEMENT FOR
ABSORPTION REFRIGERATION SYSTEMS
Richard H. Merrick, Indianapolis, Ind., assignor to Carrier Corporation, Syracuse, N.Y., a corporation of Delaware
Filed Sept. 16, 1966, Ser. No. 580,124
8 Claims. (Cl. 62—476)

This application relates to a solution storage arrangement in absorption refrigeration systems, and more particularly, to the provision of a rectifier solution storage reservoir within the rectifier section of an absorption refrigeration system.

This application is a continuation-in-part of and discloses inventions and features described in my copending application Ser. No. 368,775, filed May 10, 1964, now patent No. 3,273,351, granted Sept. 20, 1966, entitled, "Absorption Refrigeration."

An absorption refrigeration system operating at a given set of conditions can be designed to have an absorbent solution and refrigerant charge which is precisely correct to obtain optimum operating efficiency. However, the quantity of solution circulated varies in practice, because varying evaporator loads and varying condenser and absorber ambient temperatures result in differing vapor volumes and densities of solution in parts of the system. It is therefore necessary to provide some suitable means for solution storage to obtain satisfactory operation of the system. Accordingly, it is known to provide a separate generator reservoir in which to store absorbent solution when not needed and to assure that the generator is adequately supplied with solution. It will be apparent, however, that it would be desirable to eliminate the complication and cost of a separate generator reservoir while at the same time providing some means for automatically adding or removing the desired quantity of solution from the refrigeration system during operation thereof.

Accordingly, it is a principal object of this invention to provide an improved, simple and inexpensive means for automatically storing excess solution in an absorption refrigeration system.

It is a further object of this invention to provide an improved absorption refrigeration system which utilizes the rectifier for storage of excess absorbent solution, thereby eliminating the necessity of a separate generator reservoir or other solution storage vessel.

It is a still further object of this invention to provide an improved storage means which automatically maintains the proper level and quantity of solution in the analyzer of an absorption refrigeration system.

In accordance with a preferred embodiment of this invention, an absorption refrigeration system of the type employing a flooding vertical analyzer and a generally horizontal rectifier is provided with a concentric spaced shell within the rectifier which forms a rectifier solution storage reservoir. The annular space between the rectifier solution storage reservoir and the rectifier shell is utilized as a refrigerant vapor passage and as a location for a solution heat exchanger, while at the same time, the space within the inner shell is used to store absorbent solution. A weir is provided for maintaining the desired height of absorbent solution in the flooded analyzer column and for feeding the excess solution to the rectifier solution reservoir. A restricted passage is provided for continuously passing a quantity of absorbent solution out of the rectifier solution reservoir into the flooded analyzer, thus automatically maintaining the concentration of solution in the reservoir similar to that in the analyzer. By this means, the head of solution in the reservoir is used to automatically balance the height of solution in the analyzer to assure proper functioning of the analyzer under all conditions of operation. The excess solution is automatically collected and stored in the rectifier solution reservoir but is not permitted to accumulate excess refrigerant because the contents of the reservoir are continually circulated back to the generator through the analyzer.

Other features of this invention will become more readily apparent by referring to the following specification and attached drawing wherein the figure is a schematic flow diagram of an absorption refrigeration system embodying this invention.

Referring to the drawing, there is shown an absorption refrigeration system having an absorber 10, a condenser 11, an evaporator 12, and a generator 13 connected to provide refrigeration. A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred to as an "absorbent solution" although it will be appreciated that pure water is not technically a solution.

A chilled water pump 20 is provided for forwarding water, or other heat exchange medium chilled in evaporator 12, through chilled water line 21 to a suitable remote location for chilling a refrigeration load. The water is then returned through chilled water line 22 to a spray header 19 from which it is distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior of the evaporator coil. The refrigerant vapor passes from coil 27 through vapor line 28, the interior passage of liquid suction heat exchanger 25, to mixing line 29 where it is mixed with strong solution to returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorber coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35, in the preferred embodiment of this invention, comprises an outer shell 46 forming a vapor passage. Shell 46 contains a heat exchanger comprising an inner heat exchanger passage 45 and a concentric outer heat exchanger passage 36, as shown in the drawing. Heat exchanger 36 may be provided with suitable exterior fins for enhancing heat transfer. It is preferred that the heat exchangers comprise passages or coils 36 and 45 formed in a helical shape with the major diameter of the helix being slightly less than the inner diameter of shell 46 as shown in the drawing. A tubular, concentric rectifier solution reservoir shell 65 is disposed in and spaced from shell 46 to provide an annular refrigerant vapor passage in which helical heat exchange passages 36 and 45 are located. The interior of shell 65 forms a rectifier solution reservoir 66.

It will be seen that the annular space between shell 46 of rectifier 35 and shell 65 of rectifier solution reservoir 66 forms a first passage for vapor passing from the generator to the condenser, the annular space between coils 45 and 36 forms a second passage through the rectifier for weak solution passing from the absorber to the generator, and inner coil 45 forms a third passage for strong solution passing from the generator to the absorber. The weak solution is therefore in heat exchange relation with both the strong solution passing to the generator and vapor passing to the absorber.

The weak solution from line 32 passes through coil 36 in the annular space between inner heat exchange coil 45 and outer heat exchange coil 36 where the weak solution is heated to substantially its boiling point by heat exchange with strong solution. After passing through coil 36, the heated weak solution is discharged from opening 37 into analyzer column 38.

Analyzer 38 comprises a vertically oriented shell forming an analyzer column. A plurality of baffles 39 are preferably disposed within analzer 38 to form a tortuous path for the passage of vapor and solution through the analyzer.

A relatively horizontally extending shell 46 is disposed in communication with the shell of analyzer 38 adjacent the upper region thereof to form a rectifier 35. Shell 46 is tubular and preferably circular in cross section. Shell 65 of rectifier solution reservoir 66 is preferably coaxially concentrically disposed within shell 46 to provide an annular space between the shells. The hollow interior of tubular shell 65 forms a rectifier solution reservoir 66 which is preferably slanted slightly horizontally downward toward analyzer 38 to facilitate gravity drainage of solution from reservoir 66. Similarly, shell 46 of analyzer 35 is preferably slanted slightly horizontally downward toward analyzer 38 to facilitate drainage of rectifier condensate through condensate trap line 67 to a suitable location in the side of analyzer 38.

Analyzer column 38 is flooded with weak absorbent solution discharged from opening 37. In practice, the solution may assume a frothy consistency due to refrigerant vapor in the column of solution. The absorbent solution passes downwardly in the column where it enters generator tubes 50 and is heated by suitable means such as gas burner 73. Heating of the absorbent solution liberates refrigerant vapor therefrom and thereby concentrates the solution. The mixture of concentrated or strong solution and refrigerant vapor is discharged from generator tubes 50 into separation chamber 70. An equilizing aperture 71 is provided in chamber 70 to maintain proper solution volume and vapor space in the chamber. Separation chamber 70 has a perforated top 72 to permit vapor to pass upwardly through analyzer 38. The strong solution separates from the vapor and accumulates in the bottom of separation chamber 70. The strong solution then passes upwardly through analyzer heat exchanger 47 from which it passes through heat exchange passage 45, strong solution line 60 and restriction 61 into absorber 10.

The bubbles of refrigerant vapor, having a quantity of absorbent vapor mixed therewith, pass upwardly through analyzer 38 in mass and heat transfer relation with absorbent solution therein in order to purify the refrigerant vapor. The vapor reaching the upper region of analyzer 38 passes into the annular space formed in rectifier 35 between rectifier reservoir shell 65 and rectifier shell 46. Here, the refrigerant vapor passes in heat exchange relation with the relatively cool weak absorbent solution passing to the generator, thereby condensing additional absorbent from the vapor and further purifying the refrigerant vapor. The refrigerant vapor passes from rectifier 35 through line 58 to condenser 11 where the heat of vaporization is given up to ambient air and the refrigerant is condensated to a liquid. The condensed absorbent solution passes into analyzer 38 through trap line 67.

The level of absorbent solution in analyzer 38 is determined by the vertical location of the top of a weir 76 disposed between the rectifier and the analyzer. The top of weir 76 is spaced from the top of shell 46 to admit vapor from the analyzer into the rectifier. A restricted aperture 77 is formed in weir 76 or between the bottom of weir 76 and shell 46 so as to permit drainage of solution by gravity from rectifier solution reservoir 66 into analyzer 38. Since the density of solution in analyzer 38 is lower than that in reservoir 66 due to the presence of vapor therein, the level of solution in analyzer 38 will be somewhat higher than the level of solution in rectifier solution reservoir 66. Restricted aperture 77 permits a quantity of solution to continuously pass from rectifier solution reservoir 66 into analyzer 38. This prevents the unwanted accumulation of an excess charge of refrigerant dissolved in solution in the reservoir by maintaining the solution concentrations similar. By continuously bleeding solution from the reservoir into the analyzer and generator, and from the analyzer back into the reservoir, solution is not permitted to stagnate in the reservoir, so an excessive quantity of refrigerant will not be retained therein.

Furthermore, the arrangement described automatically maintains the proper level of absorbent solution in analyzer 38 regardless of the conditions of operation of the system. This is achieved because the head in rectifier solution reservoir 66 always maintains a level of solution in the analyzer at the top of weir 76 even though the amount of absorbent solution in parts of the system may vary due to changes in solution density in the analyzer or absorber.

It will also be seen that by the practice of this invention, the necessity of providing a separate generator solution storage reservoir is eliminated by utilizing a saving in the cost of the refrigeration system. At the same time, the rectifier reservoir serves to confine the vapor passing through the rectifier to an annular region in which is located the solution heat exchanger so that optimum heat transfer is effected between vapor and weak solution.

While for purposes of illustration a preferred embodiment of this invention has been shown, it will be appreciated that the invention may be otherwise embodied within the scope of the following claims.

I claim:
1. An absorption refrigeration system comprising:
 (a) an evaporator for evaporating refrigerant to produce cooling;
 (b) an absorber for absorbing refrigerant vapor formed in said evaporator into an absorbent solution;
 (c) a generator for heating weak absorbent solution forwarded thereto from said absorber to liberate refrigerant vapor and to concentrate said absorbent solution;
 (d) a condenser for liquefying refrigerant vapor formed in said generator;
 (e) a flooded analyzer for passing refrigerant vapor from said generator in mass transfer relation with absorbent solution being forwarded to said generator, said analyzer being substantially flooded with absorbent solution; and
 (f) a rectifier for forwarding refrigerant vapor from said flooded analyzer to said condenser in heat exchange relation with weak absorbent solution passing from said absorber to said generator, said rectifier comprising:
  (1) a shell defining a vapor passage,

(2) a heat exchanger passage for passing weak solution to said generator, and (3) a rectifier solution reservoir disposed within said shell for storing excess absorbent solution within the shell of said rectifier, said rectifier solution reservoir being arranged to receive absorbent solution therein and to pass absorbent solution therefrom to said flooded analyzer.

2. An absorption refrigeration system as defined in claim 1 including a restricted passage extending between said rectifier solution reservoir and said flooded analyzer for continuously passing a quantity of absorbent solution from said rectifier reservoir into said flooded analyzer.

3. An absorption refrigeration system as defined in claim 1 including passage means extending between said analyzer and said rectifier solution reservoir for passing absorbent solution from said analyzer into said rectifier solution reservoir.

4. An absorption refrigeration system as defined in claim 1 including a solution weir disposed between said flooded analyzer and said rectifier solution reservoir for governing the height of solution in said flooded analyzer by governing the passage of absorbent solution from said flooded analyzer to said rectifier solution reservoir.

5. An absorption refrigeration system as defined in claim 1 wherein said rectifier solution reservoir comprises a shell disposed within and spaced from said rectifier shell to form a passage therebetween, said refrigerant vapor and said weak solution in said rectifier passing through the passage formed between said shells.

6. An absorption refrigeration system as defined in claim 5 including a solution heat exchanger disposed in said passage between said shells, said solution heat exchanger serving to pass weak absorbent solution in heat exchange relation with both vapor passing through said rectifier to said condenser and with strong solution passing to said absorber.

7. An absorption refrigeration system as defined in claim 1 wherein said rectifier solution reservoir slants horizontally downwardly toward said analyzer to drain solution by gravity from said reservoir into said analyzer.

8. An absorption refrigeration system as defined in claim 1 wherein:
  (a) said shell comprises a tubular outer shell;
  (b) said rectifier solution reservoir comprises a tubular inner shell disposed concentrically in and spaced from said tubular shell thereby defining a confined vapor passage therebetween for refrigerant vapor passing to said condenser;
  (c) a solution heat exchanger disposed in said annular vapor passage for passing weak absorbent solution from said absorber to said generator in heat exchange relation with both refrigerant vapor in said vapor passage and strong absorbent solution passing from said generator to said absorber;
  (d) a weir for governing the level of absorbent solution in said flooded analyzer and for admitting absorbent solution from said analyzer into said rectifier solution reservoir when the solution in said flooded analyzer reaches a predetermined level, said weir being spaced from an upper region of said rectifier to form a refrigerant vapor passage for vapor passing from said analyzer to said rectifier; and
  (e) a restricted passage extending between said rectifier solution reservoir and said analyzer for continuously discharging a quantity of absorbent solution from a lower region in said rectifier solution reservoir to said rectifier.

References Cited
UNITED STATES PATENTS

| | | | |
|---|---|---|---|
| 3,140,591 | 7/1964 | Brown et al. | 62—495 |
| 3,320,760 | 5/1967 | Swearingen | 62—141 |

LLOYD L. KING, *Primary Examiner.*

UNITED STATES PATENT OFFICE
CERTIFICATE OF CORRECTION

Patent No. 3,368,367                      February 13, 1968

Richard H. Merrick

It is certified that error appears in the above identified patent and that said Letters Patent are hereby corrected as shown below:

Column 1, line 17, for "May 10, 1964" read -- May 20, 1964 --; line 55, for "flooding" read -- flooded --; column 2, line 44, after "solution" strike out "to"; column 4, line 6, for "condensated" read -- condensed --; line 43, after "utilizing" insert -- otherwise wasted space in the rectifier, thereby achieving --.

Signed and sealed this 15th day of July 1969.

(SEAL)
Attest:

Edward M. Fletcher, Jr.                      WILLIAM E. SCHUYLER, JR.
Attesting Officer                                  Commissioner of Patents